April 5, 1960    H. W. CRUM    2,931,511
TIRE DISPLAY APPARATUS
Filed Jan. 21, 1958    2 Sheets-Sheet 1

INVENTOR.
HAROLD WEBSTER CRUM
BY
Oldham & Oldham
ATTYS.

April 5, 1960 H. W. CRUM 2,931,511
TIRE DISPLAY APPARATUS
Filed Jan. 21, 1958 2 Sheets-Sheet 2

INVENTOR.
HAROLD WEBSTER CRUM
BY
Oedham & Oedham
ATTYS.

United States Patent Office 2,931,511
Patented Apr. 5, 1960

2,931,511

TIRE DISPLAY APPARATUS

Harold Webster Crum, Bridgeport, Conn.

Application January 21, 1958, Serial No. 710,358

2 Claims. (Cl. 211—23)

This invention relates to apparatus for displaying vehicle tires and is especially useful where tires are to be displayed for sale at service stations or stores.

In the display of rubber vehicle tires for sale it has long been recognized that the tire is best shown in the position it assumes in use, or with its axis horizontal, so that both the sidewalls and the tread of the tire will be in the positions they would appear in when mounted on a vehicle. It has also been recognized that the display device should so support the tire as to permit its being placed without other support in any desired display position.

Heretofore a number of tire display devices have been proposed for so supporting a tire. Such devices have generally included a pair of supporting members hinged to each other, generally at two positions and each adapted to extend from a supporting floor to a position bearing against a sidewall of the tire, the weight of the tire being carried by the hinged portions and the reaction causing the sidewall contacting upper portions of the device to press against the sidewall. Such devices have in some instances been made of sheet metal or of metal rods and castings and have been expensive. In other instances, the devices have been made of cardboard and have not been weatherproof. Also, the cardboard displays have not had the desired strength and were of short life.

All of the prior devices have undesirably covered a large area of the tire and have detracted from viewing the tire. In fact, the side panels have generally been so printed as to attract attention to the display device rather than to the tires.

It has been the nature of prior art devices, that when it was attempted to lift the tire to move it to a different position, the display stand was separated from the tire by release of weight of the tire so that moving a display tire required separate moving of the support and the tire.

The present invention aims to overcome the foregoing and other difficulties.

It is an object of the invention to provide a sturdy support for a tire which will display a maximum amount of the tire's surface in the position which the tire assumes in use.

Another object is to provide a support which will sufficiently brace the tire against displacement.

Another object of the invention is to provide a support which will grip the tire with a minimum of lateral pressure against its sidewalls.

A further object is to provide a support which will cling to the tire and will permit moving the tire and the support as a unit.

Further objects are to provide a support which may be cheaply constructed, will require a minimum amount of space in shipping and storing, and will accommodate itself to ranges of tire sizes.

These and other objects will be apparent from the following description, reference being had to the accompanying drawings forming a part hereof.

Figure 1:
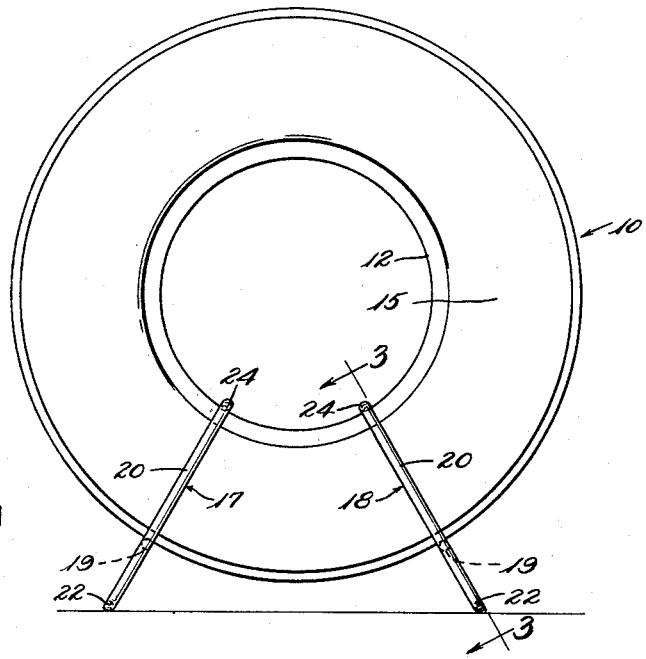
Fig. 1 is a side elevation of a pneumatic vehicle tire supported by apparatus embodying the invention.

Referring to the drawings, the numeral 10 designates a pneumatic tire casing open at its inner circumference, as at 11, the opening being defined by laterally spaced apart rim-engaging bead portions 12, 13. The tire has a tread portion 14 joined to the bead portions by sidewalls 15, 16.

For supporting the tire casing, a pair of similar supports 17, 18 are provided. Each support is formed from a single piece of spring steel wire or rod and comprises a tire tread-engaging horizontal base reach 19, a pair of straight sidewall-engaging wing members 20, 21 connected to the base reach 19 by depending loops 22, 23 providing spaced apart feet for engaging a supporting surface, and inwardly directed bead-engaging ends 24, 25 at the tops of the wing members forming a side parallel to the side at base reach 19. All of the elements of each support lie in a single plane forming a generally trapezoidal shape open at the center of the shorter of its parallel sides between ends 24, 25 and offset inwardly at the center of its wider parallel side at 19 to form reentrant angles defining a ground-clearing space.

The depth of the space from the base reach to the inwardly directed bead-engaging ends, which are parallel thereto, is made equal to or greater than the radial overall dimension of the tire casing to be supported and the wing members 20, 21 are spaced apart by an amount permitting contact of such wing members with the sidewalls of the tire casing at a position radially outward from the bead portions of the tire casing.

Figure 4:
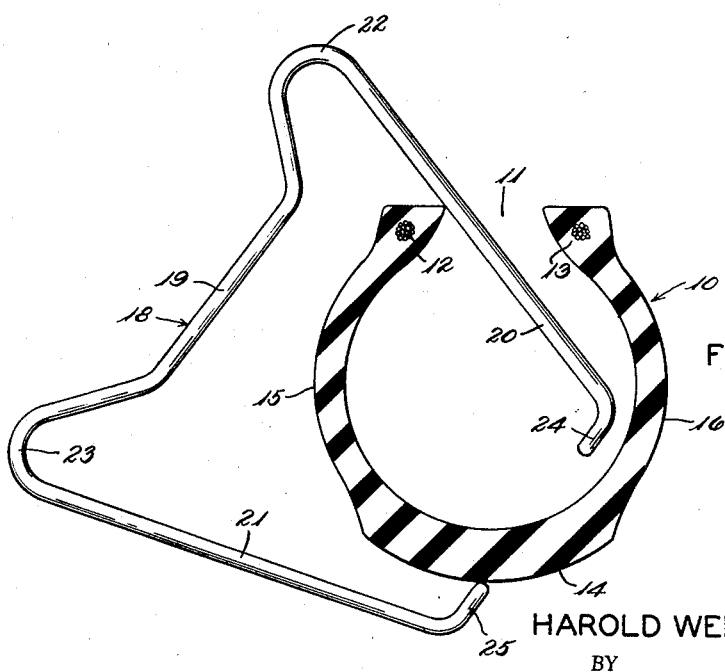
Fig. 4 is a similar view of the tire in cross section and one of the supports showing one manner of assembling the support and the tire.

In use, the support is placed about the tire casing with its bead-engaging ends 24, 25 overlapping the bead portions of the tire casing and its horizontal base reach 19 contacting or spaced slightly from the tread of the tire casing and its wing members 20, 21 adjacent the sidewalls of the tire casing. The wing members may be sprung apart to permit mounting the support on the tire casing or the support may be mounted in the manner illustrated in Fig. 4 of the drawings, which shows the wing member 20 inserted between the tire bead portions and the wing member 21 outside the casing. By rotating the support in a counter clockwise direction, as seen in Fig. 4, in the plane of the drawing, the support may be applied with little or no deformation of the tire casing or the support. As the support is of spring material and the tire casing is rather flexible, either may be deflected to place the support.

Figure 2:
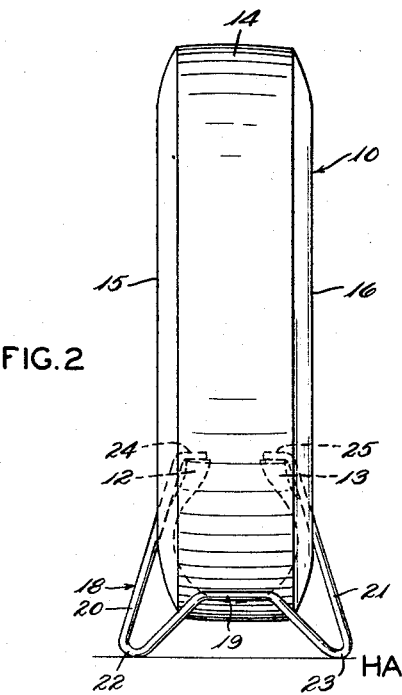
Fig. 2 is an end elevation of the same.
Figure 3:
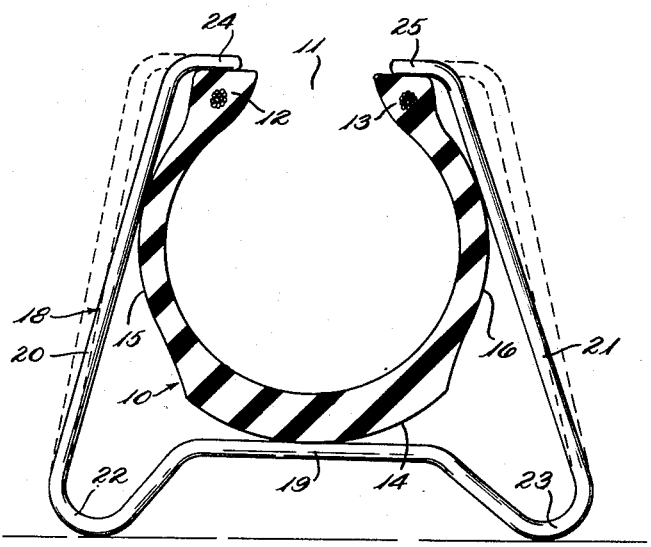
Fig. 3 is a sectional view taken on line 3—3 of Fig. 1, the tire being shown in section and one of the supports being shown in solid lines in elevation and in dotted lines in slightly open, assembly position before the weight of the tire is applied thereto.

With the support mounted upon the tire casing and the tire casing and support placed on a horizontal surface in the manner illustrated in Figs. 1 and 2, it will be seen that a portion of the weight of the tire casing will rest upon the base reach 19 of the support forcing the support to tend to rotate about its support positions 22, 23 as a fulcrum and urging the inwardly turned ends 24, 25 against the bead portions of the tire casing. This places the tire casing under radial compression.

While one support 18 might be applied to the tire casing and would alone support a casing on a level surface, the tire bead contacting the surface to provide a third point of support, it is preferred to provide two oppositely inclined supports 17, 18 and thereby to provide a stable support on a slightly inclined surface. The supports are applied to the tire casing in the manner described and are inclined in opposite directions as seen in Fig. 1.

The supports expose almost the entire tire casing to view and do not detract attention from the tire casing. Being flat, they may be stored in small space when not in use.

As the supports are of spring material and bear against the sidewalls of the tire with sufficient pressure to hold them in place, the tire may be lifted and moved about with the supports in place.

While a certain embodiment of the invention has been described and illustrated in order to explain the invention, it will be apparent to one skilled in the art that various changes and modifications may be made without departing from the scope of the invention as it is defined by the following claims.

I claim:

1. In combination, a tire and tire display apparatus, the tire display apparatus comprising a pair of bodies of spring wire of generally trapezoidal form, each having a wide base, relatively long inwardly inclined sides extending therefrom, and inwardly turned bead-engaging ends spaced from each other to provide an open narrow side opposite and parallel to its base, said bodies each lying in a plane and being positioned to engage said tire casing in substantially radially directed planes of the tire casing at spaced circumferential portions thereof inclined to each other with their bases in a plane radially spaced outwardly of the tire casing for engaging a common flat support, and said bodies each having a tread-engaging portion extending transversely of the tire and spaced inwardly of its base for receiving the weight of a tire casing to rotate said bead-engaging ends of said bodies toward each other about their bases as fulcrums to force said bead-engaging ends axially inwardly of the tire casing.

2. Tire display apparatus comprising a pair of bodies of spring wire of generally trapezoidal form and each lying in and defining a plane, each of said bodies having a wide base, relatively long inwardly inclined sides extending therefrom, and inwardly turned bead-engaging ends spaced from each other to provide an open narrow side opposite and parallel to its base, said bodies being positionable to engage said tire casing in substantially axial planes of the tire casing at spaced circumferential portions thereof inclined in towards each other with their bases in a plane radially spaced outwardly of the tire casing for engaging a common flat support, and said bodies each having a tread-engaging portion spaced inwardly of its base for receiving the weight of a tire casing to rotate said bead-engaging ends of said bodies toward each other about their bases as fulcrums to force said bodies toward each other about their bases as fulcrums to force said bead-engaging ends axially inwardly of a tire casing with which said bodies are engaged to aid said bodies in grasping a tire firmly.

References Cited in the file of this patent

UNITED STATES PATENTS

| | | |
|---|---|---|
| 612,663 | Haubs | Oct. 18, 1898 |
| 1,730,845 | Ganson | Oct. 8, 1929 |
| 1,864,234 | Doering | June 21, 1932 |
| 2,284,299 | Owen | May 26, 1942 |